July 7, 1936.  H. A. STAPLES  2,046,978
HOLLOW CABLE
Filed June 14, 1935
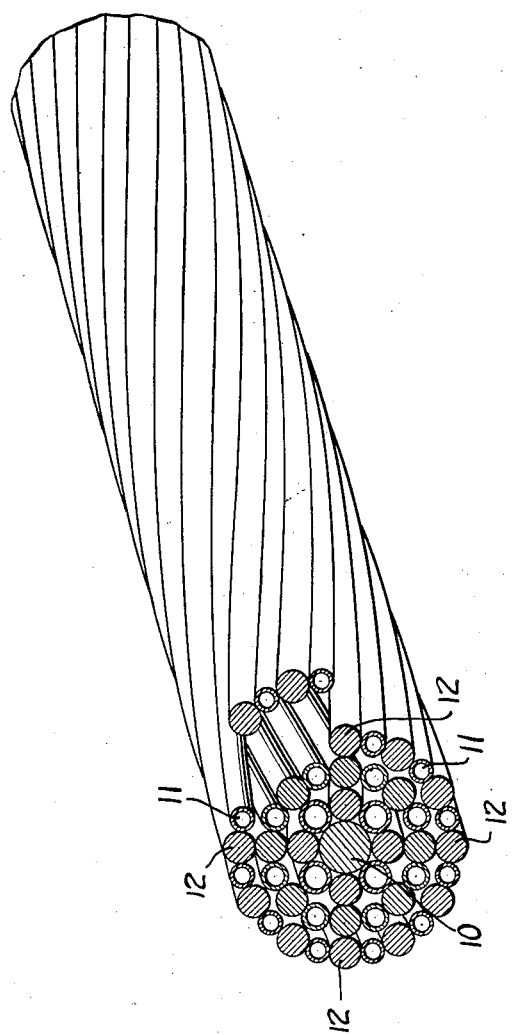
INVENTOR
Horace A. Staples
BY
ATTORNEY Patented July 7, 1936

2,046,978

UNITED STATES PATENT OFFICE 2,046,978

HOLLOW CABLE

Horace A. Staples, Plainfield, N. J., assignor to Phelps Dodge Copper Products Corporation, New York, N. Y., a corporation of Delaware Application June 14, 1935, Serial No. 26,614

6 Claims. (Cl. 173—13)

My invention relates to that class of electrical conductors commonly known as hollow cables in which the desired effect is the combination of large outside diameter with light weight and with a minimum amount of metal. Such cables have been constructed out of hollow tubes and a combination of hollow tubes and solid wires stranded in alternate layers. I have found in practice that when a cable is made after this design the layer of hollow wires presents an inherent weakness and abnormal stress on a cable of this design may result in a dentation of the hollow wires and consequent reduction of diameter of the cable.

The object of this invention is to produce a cable comprising layers of stranded alternate hollow and solid wires in such a manner that each layer of strands is carried only on the solid wires of the underlying layer, the wires bridging across the preferably smaller hollow wires. With this construction there will be no indentation under abnormal stress of the hollow wires under transverse or longitudinal stress as is the case where each helical layer of strands is all hollow wires. This construction also permits the use of solid high strength members in all stressed components of a restricted circular millage cable.

With my construction the mechanical use of the hollow wires in addition to taking their share of the longitudinal stress, is to act merely as spacers to equalize the loading by maintaining the solid members in equidistant circumferential position, while at the same time the solid wires in adjacent layers are in contact radially presenting a solid foundation.

It is well known that large diameter solid component members are the most desirable in cables but in the case of light weight large diameter construction cables, it is difficult to obtain the desired component sizes without exceeding the required area of cross section and one of the objects of my invention is to overcome the difficulties of design in approaching this most desirable construction.

The use of hollow members as spacers reduces the area of cross section required to obtain the desired diameter of construction without endangering the equidistant spacing of stressed solid members. As will be readily understood, where high tensile strength is required, the use of high tensile material in the solid wires, especially the wires of the inner layers will secure the desired result.

The foregoing and other features of my invention will now be described in connection with the accompanying drawing forming part of this specification in which I have represented my hollow cable in its preferred form after which I shall point out in the claims those features which I believe to be new and of my own invention.

The accompanying drawing shows a perspective view of one example of a cable constructed according to the invention.

In carrying out my invention I provide a core 10 of any suitable construction, such as a solid wire, or a twisted strip, or a lipped tube core, around which I strand layers of conductors composed of alternate hollow and solid wires, the hollow wires 11 separating the solid wires 12 in each layer circumferentially. Each layer of wires is stranded in the opposite direction from the underlying layer so that each layer of strand is carried on the solid wires of the underlying layer, the wires bridging across the preferably smaller hollow wires. With this special stranding there is solid wire on solid wire and there is no possibility of indentation of the hollow wires under abnormal transverse or longitudinal stress.

In the preferred construction, the hollow spacer wires are smaller than the solid wires, except in the outer layer of strand, in which the hollow wires are not necessarily smaller, and which may be composed of all solid wires, or all hollow, or a mixture, dependent on the circular mills per unit diameter and the electrical characteristics desired.

While I have shown an arrangement of layers composed of one solid and one hollow wire, alternately disposed, I may use other arrangements, such as one solid and two hollow, or two solid and one hollow, or any other proportion of hollow and solid wires, depending on the desired characteristics of the cable.

I wish it distinctly understood that my hollow cable herein described and illustrated is in the form in which I desire to construct it and that changes or variations may be made as may be convenient or desirable without departing from the salient features of my invention and I therefore intend the following claims to cover such modifications as naturally fall within the lines of invention.

I claim:

1. An electric cable comprising a plurality of wires stranded in layers, each layer comprising hollow and solid wires lying alternately, the solid wires of one layer crossing and contacting with the solid wires of the adjacent layer, the hollow wires acting as spacers to hold the solid wires of each layer in spaced relation.

2. The cable of claim 1 with the hollow wires smaller in diameter than the solid wires.

3. An electric cable comprising a plurality of concentric layers of alternately lying hollow and solid wires stranded about a core, the solid wires in each layer being spaced circumferentially by means of the hollow wires each solid wire being in contact radially with the solid wire of the adjacent layers.

4. An electric cable comprising a core of suitable material, a layer of circumferentially contacting alternate hollow and solid wires stranded about the core, a layer of circumferentially contacting alternate hollow and solid wires stranded about the first layers, the solid wires of the upper layer radially bearing upon the solid wires of the underlying layer and bridging across the hollow wires of the underlying layer.

5. An electric cable comprising layers composed of circumferentially contacting alternate stranded hollow and solid wires with the solid wires of the overlying layer bearing upon the solid wires of the under layer but not bearing upon the hollow wires.

6. The cable of claim 5 with the hollow wires smaller in diameter than the solid wires.

HORACE A. STAPLES.